(12) United States Patent
Dollar et al.

(10) Patent No.: US 6,817,813 B2
(45) Date of Patent: Nov. 16, 2004

(54) REVERSIBLE CUTTER BIT

(76) Inventors: Tammy Elaine Dollar, 476 NC Hwy., 194 South, West Jefferson, NC (US) 28694; Robert William Yeager, 2400 Green Town Rd., Lansing, NC (US) 28643; Robert Glenn Hall, 200 Casey Branch Rd., Purlear, NC (US) 28665

( * ) Notice: Subject to any disclaimer, the term of this patent is extended or adjusted under 35 U.S.C. 154(b) by 338 days.

(21) Appl. No.: 10/055,327

(22) Filed: Jan. 22, 2002

(65) Prior Publication Data

US 2003/0072624 A1 Apr. 17, 2003

Related U.S. Application Data

(60) Provisional application No. 60/328,932, filed on Oct. 11, 2001.

(51) Int. Cl.[7] .............................................. B23B 51/00
(52) U.S. Cl. ..................... 408/240; 408/226; 408/202; 409/182; 407/53; 279/155
(58) Field of Search ................... 407/53, 54; 408/226, 408/202, 239 R, 240, 1 R; 409/182, 231; 279/52, 53, 147, 155, 156

(56) References Cited

U.S. PATENT DOCUMENTS 2,898,787 A * 8/1959 Hofbauer .................... 408/230
3,811,361 A * 5/1974 Seeley et al. ................ 409/182
4,088,417 A * 5/1978 Kosmowski ................. 408/1 R
4,762,447 A * 8/1988 Marantette .................. 409/131
4,811,843 A * 3/1989 Stribiak ...................... 206/349
4,813,825 A * 3/1989 Kosmowski ................. 408/98
4,913,599 A * 4/1990 Andolora ..................... 408/48
4,922,603 A * 5/1990 Kosmowski ................. 483/56
5,029,706 A * 7/1991 McCracken ................. 206/349
5,074,025 A * 12/1991 Willard, III ................. 29/505
5,102,271 A * 4/1992 Hemmings .................. 408/226
5,116,172 A * 5/1992 Koster ........................ 408/226
5,941,764 A * 8/1999 Yang .......................... 451/358

* cited by examiner

Primary Examiner—Daniel W. Howell
(74) Attorney, Agent, or Firm—Sand & Sebolt

(57) ABSTRACT

A cutter bit for use in combination with a rotary cutter, the cutter brick comprising a removal boss integrally formed on the cutter bit shank adjacent to cutter bit body to allow removal of the cutter bit from the rotary cutting tool with a wrench ordinarily used to operate the chuck mounted on the rotary cutting tool. A boss includes a pair of spaced apart annular flanges extending outwardly from the shank and a concave angular area extending between the flanges.

10 Claims, 6 Drawing Sheets

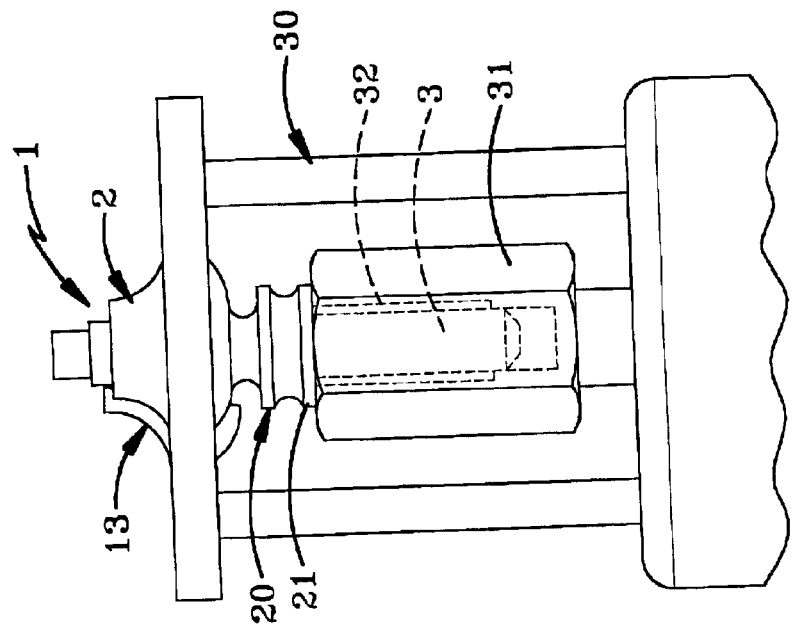
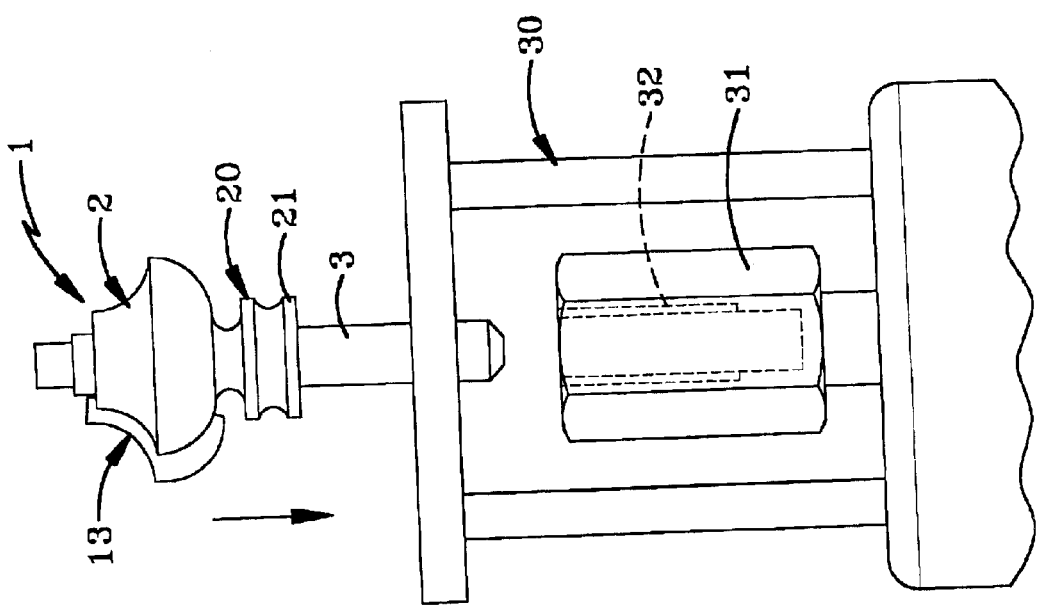

REVERSIBLE CUTTER BIT

This application claims the benefit of Provisional application Ser. No. 60/328,932 filed Oct. 11, 2001.

BACKGROUND OF THE INVENTION

1. Technical Field

The invention relates to an improved cutter bit. More particularly, the invention relates to a shaft mounted rotary cutter bit of the type mounted in rotary woodworking machines. Specifically, the invention relates to multi-edged rotary cutting bits having multiple profiles on a single bit.

2. Background Information

It is customary in building construction, as well as the construction of furniture and cabinetry to impart decorative profiles upon the wood. Moreover, many joints are created by imparting a variety of profiles on the wood to create stronger joints, as well as to provide increased surface areas for glue contact at the joint. Regardless of the reason for imparting a profile on the wood, the profile may be created in one of two methods. Hand planes may be utilized, which planes have a cutting knife shaped with a negative of the profile to be imparted on the wood. However, such planes are expensive, inaccurate and require significant skill to utilize. As such, many power tools have been specifically designed to impart a desired profile onto a workpiece while existing tools have been modified to allow those tools to also impart the desired profile.

While many such tools exist, routers and rotary cutters are by far the most prevalent. Rotary cutters include a motor which rotates a chuck at a predetermined or variable speed. When the rotary tool operator wishes to impart a given profile onto a workpiece, the shank of the a cutter bit having the desired profile is installed into the chuck. When the motor is activated, the cutter bit will rotate with each blade of the bit removing material from the workpiece creating the desired profile.

As woodworking becomes increasingly popular in the hobby market, and competition increases in the building trades, a significant number of cutter bits, each presenting a corresponding profile, have been developed. In some markets, the need to changes bits often, or alternatively, to utilize bits which have complementary shapes, has also been developed. While changing bits is not particularly difficult, a number of problems are presented to the operator. More particularly, when a finish carpenter or cabinet maker must switch bits, it is common to loosen the chuck which retains the router by the use of one or two wrenches, and to grasp the bit on or adjacent the cutter knives to remove the shank from the collet mounted in the chuck. While this presumably is adequate for the purpose for which it is intended, it often occurs that the bit will be difficult to remove and further pressure must be placed on the bit to remove it from the rotary cutting tool. It often happens that the user's fingers get cut given the close proximity of the user's fingers to the cutting knives which are extremely sharp in order to assure that a clean, smooth profile is imparted on the workpiece. When the user's fingers are cut in this nature, the cuts are often extremely deep and do not heal quickly. Additionally, given that the tool is usually housed within a garage, shop, or on a work site, the cut is more likely to become infected given the amount of dirt and debris in the work space.

Separately, when a router bit is placed into a collet, care must be taken to assure that the router bit does not bottom out in the bottom of the chuck or collet as the collet will not grip the bit as aggressively, and it is somewhat common in the work place for a bit which has been improperly chucked into the rotary tool to fly out of the tool causing property damage and injury to the operator and others surrounding the operator. It is thus important that the free end of the shank mounted within the collet extend upwardly from the bottom of the chuck in order to assure that it will aggressively grip the bit in position. On the job site when time is important, positioning the bit away from the bottom of the chuck can be difficult. As such, there is a need for a self-positioning router bit mounted on the rotary cutting tool.

Still further, most routers and rotary cutting tools come with a set of wrenches for opening and closing the chuck to insert and remove router bits respectively. Given that a significant number of tools exist on a job site or in a work shop, the need exists to reduce the number of tools which are necessary to complete ordinary tasks such as changing cutter bits. As a result, it is important that the tools which are carried by a trim carpenter or cabinet maker may be used for multiple purposes such as, for example, opening and closing the chuck on the router, and for placement on the router bit to remove the bit from the rotary cutting tool.

Thus, the need exists for a light-weight rotary cutting bit which is self-positioning on the cutting tool and which provides for a way to remove the bit from the rotary cutting tool without placing the user's hands in danger of being harmed by the cutting knives and in which the tool for removing the bit is also the tool which is used to open and close the chuck formed on the collet carried by the rotary cutting tool.

BRIEF SUMMARY OF THE INVENTION

Objectives of the invention include providing a light-weight cutter bit.

A further objective of the invention is to provide a cutter bit wherein the bit is self-positioning on the rotary cutting tool.

A still further objective is to provide a cutter bit having a boss to accept a wrench for removing the bit from the rotary cutting tool.

Yet another objective of the invention is to provide a cutter bit whereby the wrench to remove the cutter bit from the rotary cutting tool is the same wrench which is used to operate the chuck on the rotary cutting tool.

Yet another objective of the invention is to provide a cutter bit which keeps the user's hands away from the knives during bit removal and replacement.

A still further objective is to provide a cutter bit which is of simple construction which achieves the standard objectives in a simple, effective and inexpensive manner and which solves problems and satisfies needs existing in the art.

These and other objectives and advantages of the invention are obtained by the improved cutter bit, the general nature which may be stated as including a cutter comprising: a body; a shank integrally formed with the body; a boss extending outwardly from the shank; said boss having a configuration adapted for engagement with a wrench. The cutter bit as defined, in which the router bit is adapted to be engaged with a chuck, and in which the boss contacts the chuck during use.

DESCRIPTION OF DRAWINGS

FIG. 8 is a side elevational view of the multi profile bit shown in FIG. 1 before insertion into a portion of a rotary cutting tool;

FIG. 9 is a side elevational view of a portion of a rotary cutting tool with the multi profile bit shown in FIG. 1 inserted therein;

BRIEF DESCRIPTION OF THE SEVERAL VIEWS OF THE DRAWINGS

Figure 1:
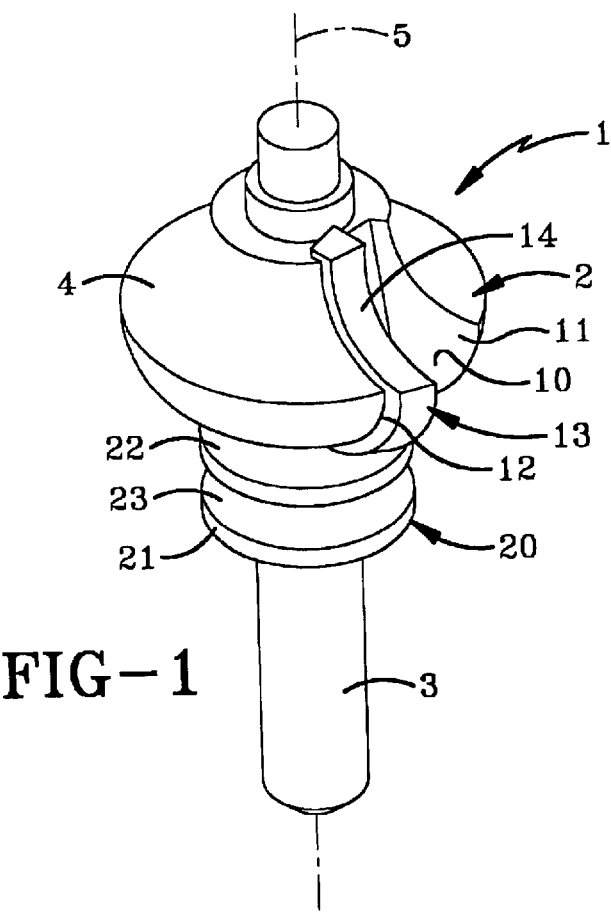
FIG. 1 is a perspective view of a multi profile bit of the present invention.
Figure 2:
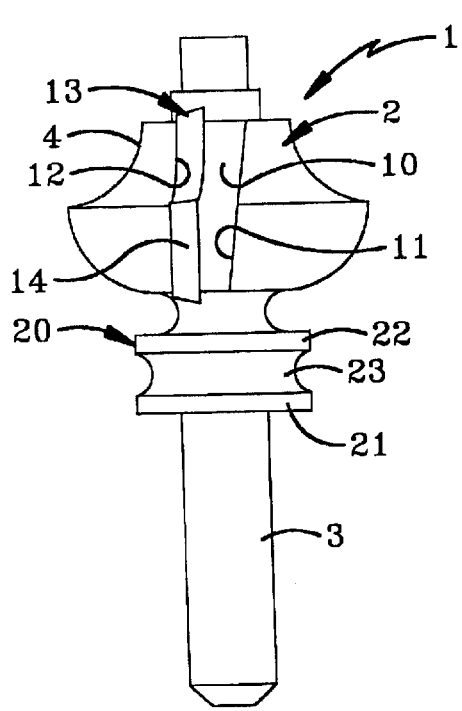
FIG. 2 is a left side elevational view of the multi profile bit shown in FIG. 1.
Figure 3:
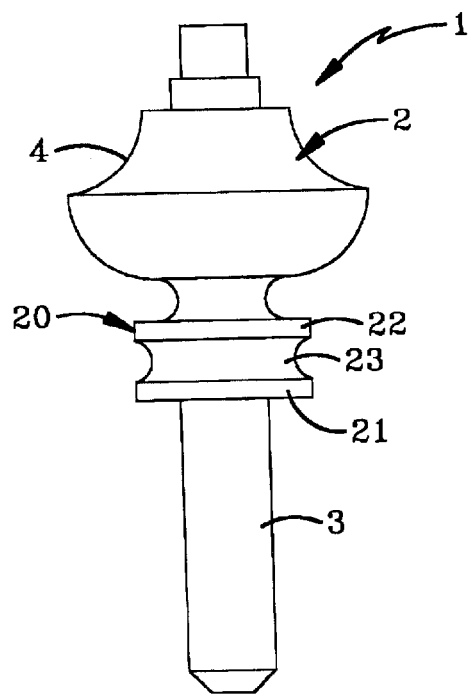
FIG. 3 is a right elevational view of the multi profile bit shown in FIG. 1.
Figure 4:
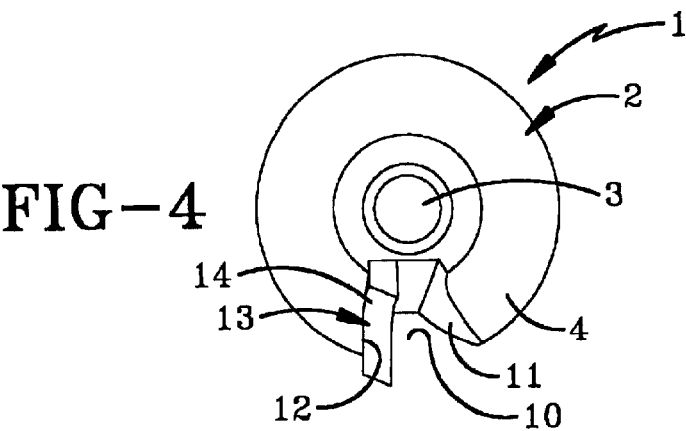
FIG. 4 is a top plan view of the multi profile bit shown in FIG. 1.
Figure 5:
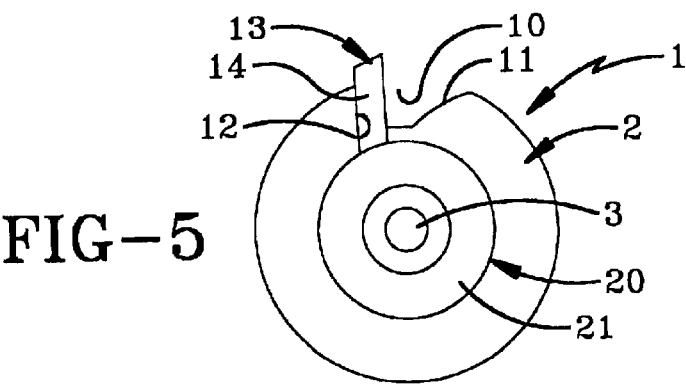
FIG. 5 is a bottom plan view of the multi profile bit shown in FIG. 1.
Figure 6:
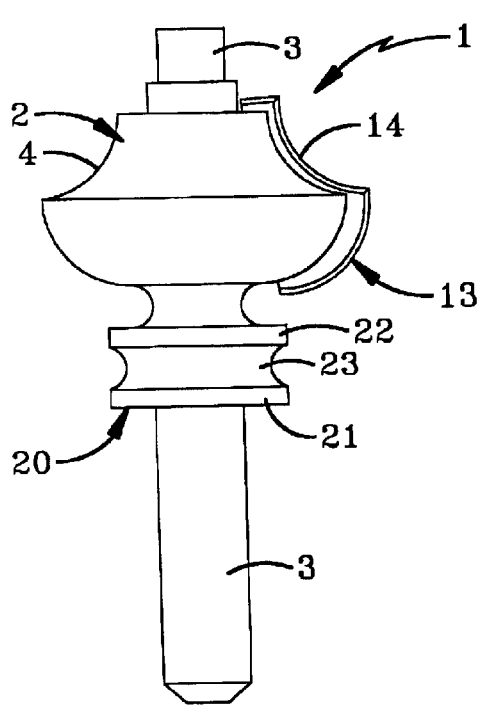
FIG. 6 is a front side elevational view of the multi profile bit shown in FIG. 1.
Figure 7:
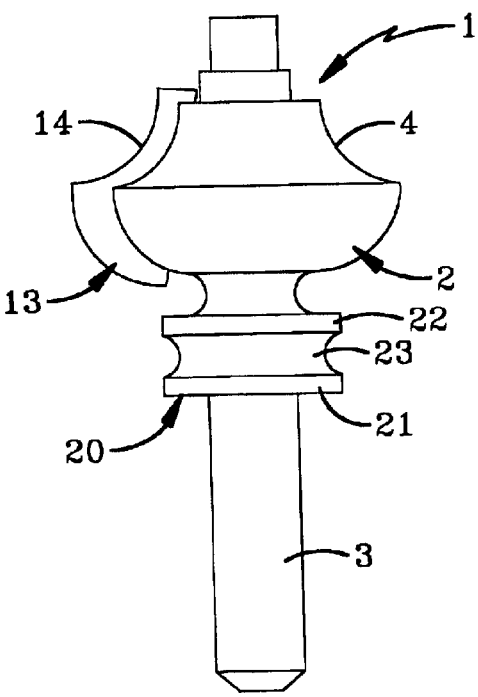
FIG. 7 is a rear view of the multi profile bit shown in FIG. 1.

The improved cutter bit of the present invention is indicated generally at 1 and is particularly shown in FIGS. 1–7. Cutter bit 1 includes a body 2 and a mounting shank 3 extending outwardly from body 2. Body 2 is integrally formed with mounting shank 3.

Body 2 is formed with an outer surface 4 and an axis of rotation 5. Additionally, body 2 is formed with a chip box 10 having an inclined surface 11 and a planar surface 12. One cutting knife 13 is attached to body 2 adjacent planar surface 12. Additionally, multiple chip boxes 10 and cutting knives 13 may be provided without departing from the spirit of the present invention. Cutting knives 13 are formed with a profile edge 14 for removing material from the workpiece. Profile edge 14 may also take a variety of shapes and configurations without departing from the spirit of the present invention for cutting straight and curved profiles.

In accordance with one of the main features of the present invention and referring specifically to FIGS. 1–7, a removal boss 20 is integrally formed with mounting shank 3. Removal boss 20 includes a lower annular flange 21 and an upper annular flange 22. Lower annular flange 21 and upper annular flange 22 are parallel and spaced apart and define an arcuate recess 23 therebetween. Removal boss 20 may be positioned in a variety of locations along mounting shank 3, and in the preferred embodiment is positioned such that lower annular flange 21 will contact the upper end of a mounting chuck before mounting shank 3 reaches the bottom of the mounting chuck (FIGS. 8 and 9).

Specifically referring to FIGS. 8 and 9, cutter bit 1 is generally utilized with a rotary cutting tool 30 having a chuck 31 for receiving the mounting shank 3 of the rotary cutter bit 1. In one form of operation, mounting shank 3 is placed within chuck 31 and is tightened by way of collet 32. When collet 32 tightens around mounting shank 3, cutter bit 1 will be positioned against movement relative to chuck 31. When rotary cutter tool 30 is turned on, chuck 31 will rotate at a range of between 6,000 and 24,000 RPMs, such that cutter knives 13 will contact the work piece, removing materials into chip box 10 and ultimately away from the cutting action associated with cutter bit 1. When the bit is installed, it can be seen that the length of mounting shank 3 from the free end thereof to the bottom of lower annular flange 21, is smaller than the length of chuck 31 and collet 32 of rotary cutter tool 30 (FIG. 9). In this manner, the user can be assured that if lower annular flange 21 is pushed against chuck 31 of rotary cutter tool 30 during operation, the free end of mounting shank 3 will not be in contact with the bottom of chuck 31. As discussed above, if the free end of mounting shank 3 were to contact the bottom of chuck 31 in operation, cutter bit 1 may loosen from rotary cutting tool 30 and fly out of the tool during operation, injuring property, the user, or others positioned around the user during operation.

Figure 10:
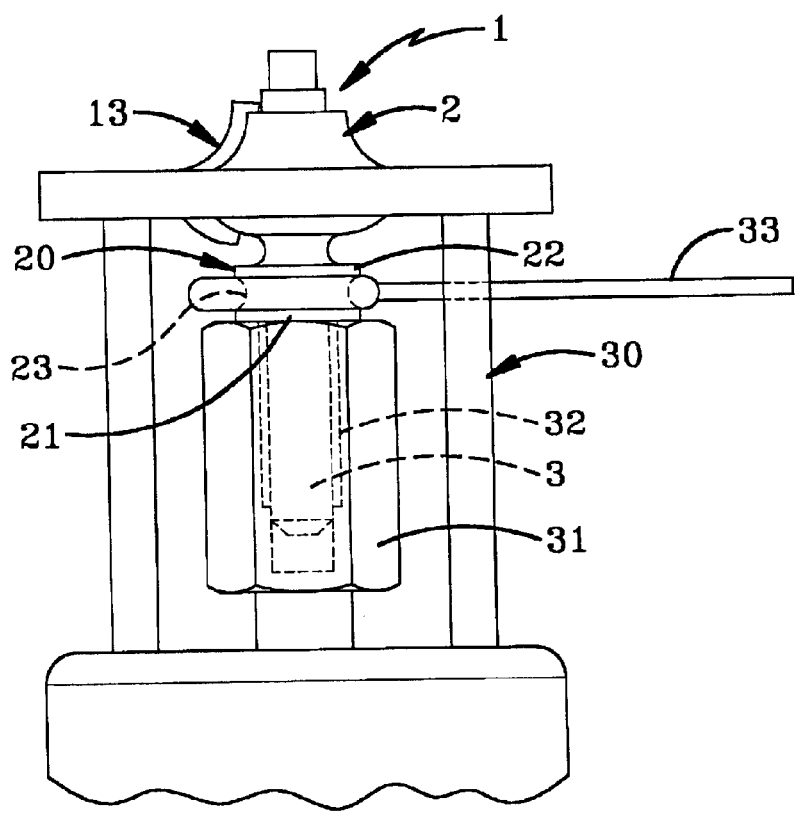
FIG. 10 is a side elevational view of a portion of a rotary cutting tool in combination with the multi profile bit shown in FIG. 1 and a wrench assisting in the removal thereof.
Figure 11:
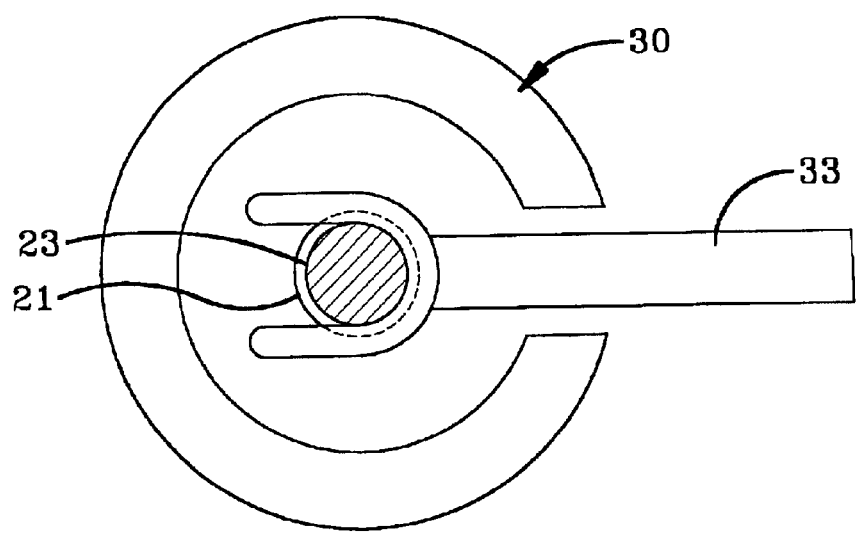
FIG. 11 is a top plan view of the rotary cutting tool and the multi profile bit shown in FIG. 10.
Figure 12:
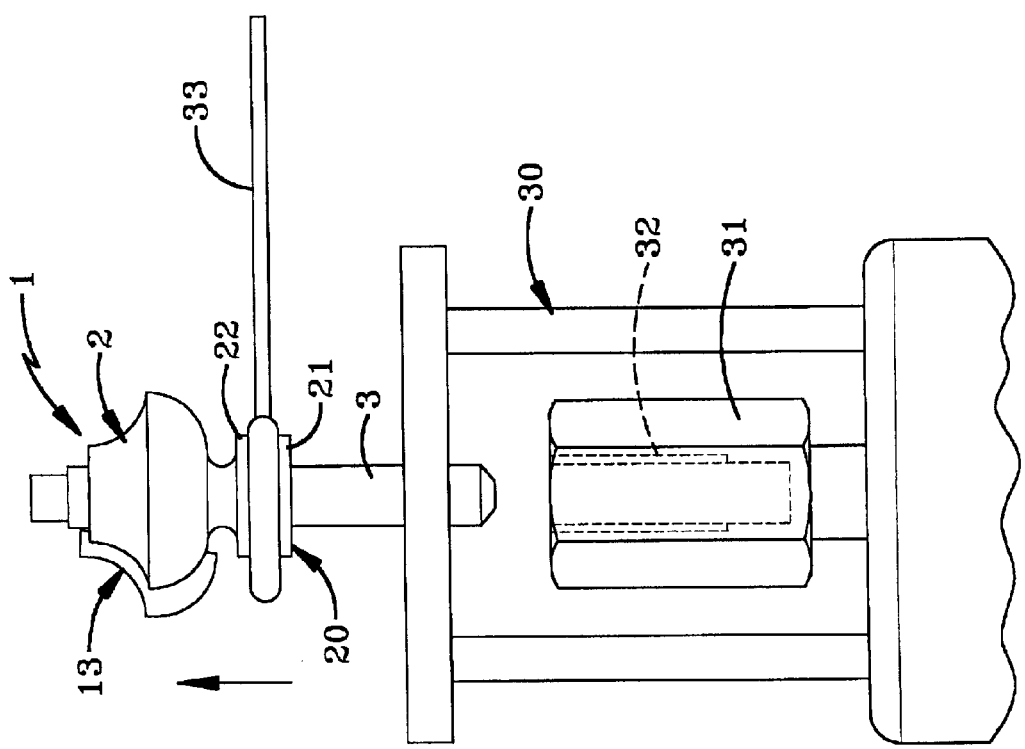
FIG. 12 is a side elevational view of a portion of a rotary cutting tool and a wrench shown removing the multi profile bit of the present invention.
Figure 13:
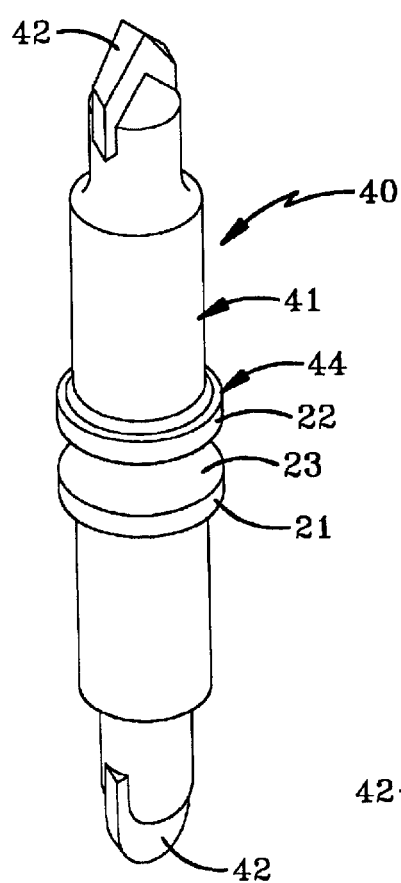
FIG. 13 is a perspective view of a second embodiment of the present invention.
Figure 14:
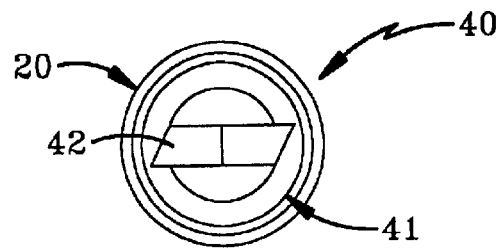
FIG. 14 is a top plan view of the second embodiment of the present invention shown in FIG. 13.
Figure 15:
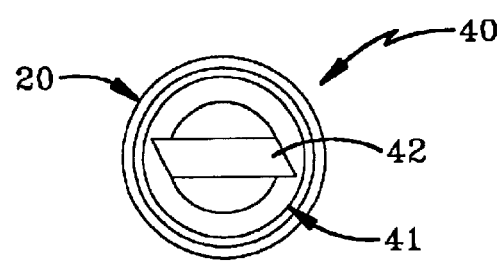
FIG. 15 is a bottom plan view of the second embodiment of the present invention shown in FIG. 13.
Figures 16, 17:
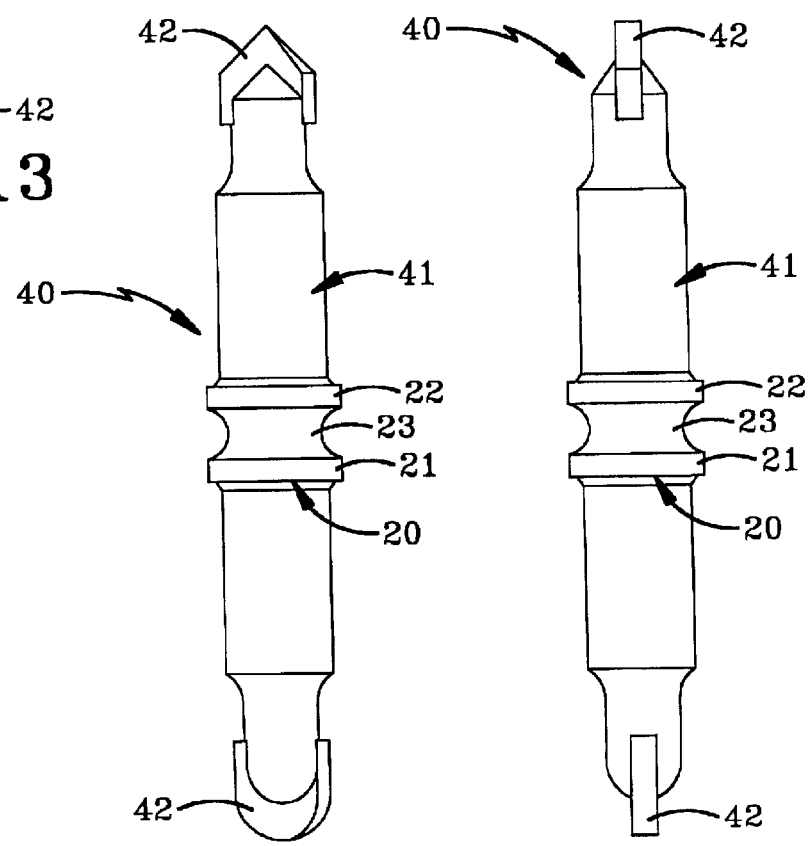
FIG. 16 is a front elevational view of the second embodiment of the present invention shown in FIG. 13.
FIG. 17 is a side elevational view of the second embodiment of the present invention shown in FIG. 13.

Once the operator determines that it is necessary to change cutter bit 1, and referring specifically to FIGS. 10–12, a wrench may be positioned within arcuate recess 23 between lower annular flange 21 and upper annular flange 22 to break the cutter bit free from chuck 31. Inasmuch as removal boss 20 is integrally formed with mounting shank 3, significant pressure can be applied to arcuate recess 23 without harming the bit. As wrench 33 applies pressure to arcuate recess 23 of removal boss 20, it will break cutter bit 1 free from chuck 31 for easy removal by the user. In this manner, the user's fingers are kept away from the sharp cutting knives 13, substantially reducing the risk of injury to the user. As should also be apparent from the above description, wrench 33 may take a variety of configurations without departing from the spirit of the present invention. However, in accordance with one of the main features of the invention, wrench 33 is the same wrench which is provided with the rotary cutting tool for opening and closing the chuck such that only a single wrench is necessary to both remove the bit from the chuck, and open the chuck. As such, it is important to realize that removal boss 20 is sized to be complimentarily related to wrench 33 provided with rotary cutting tool 30.

In accordance with a second embodiment of the invention, a second cutter bit 40 having a cutter bit on each end may also receive the benefits of a removal boss 20 mounted thereon. Cutter bit 40 is similar to cutter bit 1 in every respect except those differences which are described hereinbelow. Otherwise, similar numerals refer to similar parts throughout these drawings.

Cutter bit 40 includes a body 41 with a cutting knife 42 mounted on each end thereof. Substantially centered along the axial length of body 41 is a removal boss 44. Removal boss 44 is similar to removal boss 20 and is integrally formed with body 41. In operation, one end of body 41 is placed within chuck 31 such that the cutter bit associated with the end of body 41 housed within chuck 31 is housed within the chuck. When removal boss 44 is butted against chuck 31, the length from the tip of the cutter to lower annular flange 21 is less than the total length of chuck 31 thereby assuring that no damage occurs to the cutter bit mounted on this end of the body.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

We claim:

1. In combination, a cutter bit and a rotary cutter tool, the combination comprising:

a motor;

a chuck rotatably mounted on the motor;

a hole extending through the center of the chuck having a length;

a cutter bit having a body and a shank;

the shank fixed to be mounted in the hole and having a length and a free end;

a boss integrally formed with the shank and extending radially outwardly from the shank intermediate the body and the free end; and wherein the shank length from the boss to the free end is less than the hole length; and in which the chuck is openable and closeable with a chuck wrench, and the chuck wrench fits the boss for removal of the cutter bit from the chuck.

2. In combination, a cutter bit and a rotary cutter tool, the combination comprising:

a motor;

a chuck rotatably mounted on the motor;

a hole extending through the center of the chuck having a length;

a cutter bit having a body and a shank;

the shank fixed to be mounted in the hole and having a length and free end;

a boss extending radially outwardly from the shank intermediate the body and the free end; and in which the chuck is openable and closeable with a chuck wrench, and the chuck wrench fits the boss for removal of the cutter bit from the chuck.

3. The combination as defined in claim 2 in which the shank length from the boss to the free end is less than the hole length.

4. The combination as defined in claim 3 in which the boss is integrally formed with the shank.

5. The combination as defined in claim 4 in which the boss includes a lower annular flange and an upper annular flange spaced from the lower annular flange, and in which a concave area extends between the upper and lower annular flanges.

6. The combination as defined in claim 5 in which the boss is positioned adjacent the body.

7. The combination as defined in claim 6 in which the boss lies adjacent the chuck when the shank is mounted within the hole.

8. A method for changing a cutter bit in a rotating cutting tool comprising the steps of:

loosening the chuck on the rotating cutting tool with a wrench;

placing a wrench around a wrench engagement area on the bit;

removing the bit from the rotating cutting tool with the wrench.

9. The method as defined in claim 8 in which the wrench for loosening the chuck and the wrench for removing the bit are the same wrench.

10. The method as defined in claim 9 comprising the further step of:

abutting a boss on the bit to the chuck when the bit is reinserted into the chuck.

* * * * *